(12) United States Patent
Pfau et al.

(10) Patent No.: US 11,897,629 B2
(45) Date of Patent: Feb. 13, 2024

(54) CARGO HANDLING SYSTEM REPOSITIONABLE SIDE GUIDE

(71) Applicant: GOODRICH CORPORATION, Charlotte, NC (US)

(72) Inventors: Ryan Pfau, Jamestown, ND (US); Troy Joseph Herberholz, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 511 days.

(21) Appl. No.: 16/717,511

(22) Filed: Dec. 17, 2019

(65) Prior Publication Data
US 2021/0179266 A1     Jun. 17, 2021

(51) Int. Cl.
B64D 9/00       (2006.01)

(52) U.S. Cl.
CPC .................................. B64D 9/003 (2013.01)

(58) Field of Classification Search
CPC .... B64D 9/003; B64D 2009/006; B64D 9/00; B64D 11/0696
See application file for complete search history.

(56) References Cited

U.S. PATENT DOCUMENTS

| | | | |
|---|---|---|---|
| 3,899,092 A * | 8/1975 | Nordstrom | B60P 1/52 414/535 |
| 4,144,821 A * | 3/1979 | Lang | B64D 9/003 410/79 |
| 5,201,481 A * | 4/1993 | Hararat-Tehrani | B64C 1/10 410/121 |
| 5,310,297 A * | 5/1994 | Benjamin | B60P 7/0815 244/118.1 |
| 5,316,242 A | 5/1994 | Eilenstein-Wiegmann et al. | |
| 5,346,161 A * | 9/1994 | Eilenstein-Wiegmann | B64D 9/003 410/82 |
| 5,692,862 A | 12/1997 | Hilde | |
| 6,773,213 B1 * | 8/2004 | Moradians | B60P 7/13 410/80 |
| 8,226,163 B1 * | 7/2012 | Pearson | B64D 11/0696 296/68.1 |
| 9,809,309 B2 | 11/2017 | Kuppan et al. | |
| 10,377,572 B1 | 8/2019 | Meidinger et al. | |
| 2008/0302909 A1 * | 12/2008 | Chrissos | B64D 9/00 248/214 |
| 2009/0324356 A1 * | 12/2009 | Schulze | B64D 9/003 108/51.11 |

* cited by examiner

Primary Examiner — Christopher D Hutchens
(74) Attorney, Agent, or Firm — SNELL & WILMER L.L.P.

(57) ABSTRACT

A system for repositioning rails in a cargo bay of an aircraft. The system includes a base configured to be coupled to a structure in the cargo bay and having a first side and a second side. The system further includes a cradle for receiving a rail for restricting movement of a unit load device (ULD) in at least one direction, the cradle configured to position the rail between a first position and a second position in which the rail is closer to the second side of the base than when the rail is in the second position.

14 Claims, 5 Drawing Sheets

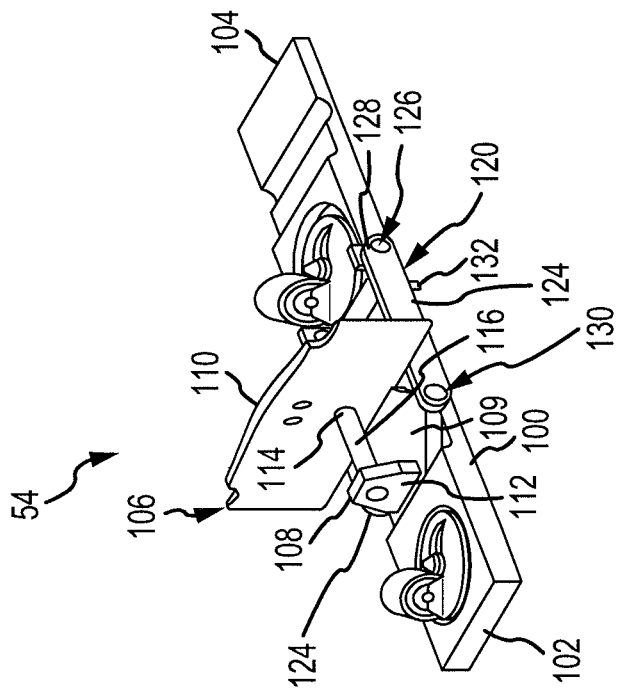
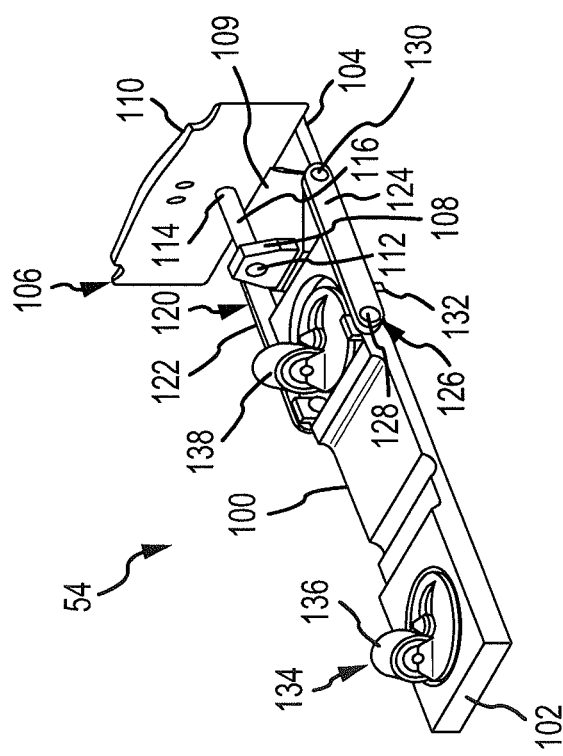
FIG.3B
FIG.3A

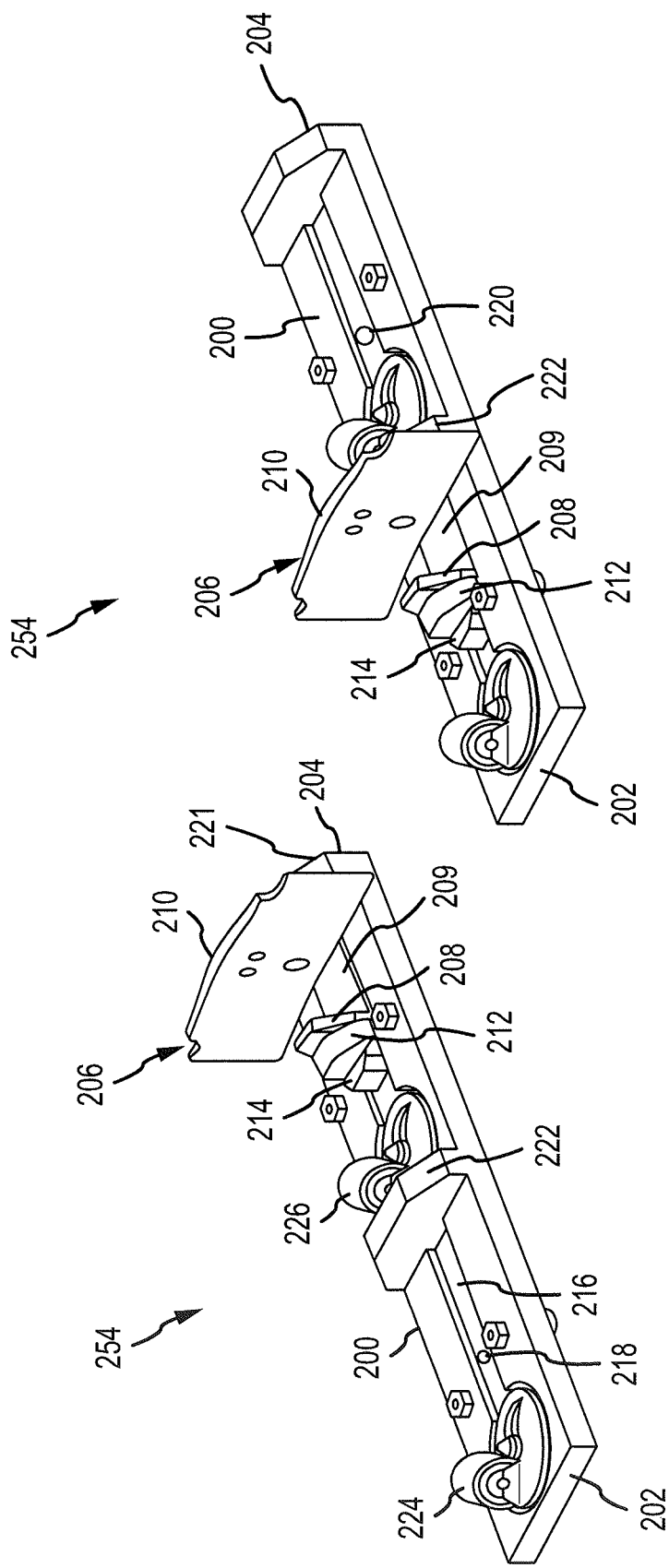

CARGO HANDLING SYSTEM REPOSITIONABLE SIDE GUIDE

FIELD

The present disclosure is directed to systems for reconfiguring a cargo bay of an aircraft by adjusting a position of a rail of a cargo system in the cargo bay.

BACKGROUND

Aircraft may transport at least one of passengers or cargo. Many aircraft thus have at least one cargo bay designed to receive cargo. In many aircraft applications, the size of cargo pallets (e.g., unit load devices (ULDs)) is a standardized set of sizes. For example, a first aircraft may be designed to transport ULDs having a first dimension and a second aircraft may be designed to transport ULDs having a second dimension that is different than the first dimension. An aircraft operator who has both aircraft may desire to reconfigure the system one type of aircraft to carry the ULDs from the second type. Alternatively, because of the different sizes of the ULDs, some aircraft are optimized to carry one size. This may result in an inefficient use of space for other ULD sizes.

SUMMARY

Described herein is a system for repositioning rails in a cargo bay of an aircraft. The system includes a base configured to be coupled to a structure in the cargo bay and having a first side and a second side. The system further includes a cradle for receiving a rail for restricting movement of a unit load device (ULD) in at least one direction, the cradle configured to position the rail between a first position and a second position in which the rail is closer to the second side of the base than when the rail is in the second position.

In any of the foregoing embodiments, the cradle includes a first wing extending away from the base and a second wing extending away from the base and located closer to the second side of the base than the first wing.

In any of the foregoing embodiments, the first wing and the second wing each define a fastener aperture such that the rail is configured to be retained in place relative to the cradle by extending a fastener through the fastener aperture of the first wing and the second wing and through the rail.

Any of the foregoing embodiments may further include a plunger configured to be received by the base to resist movement of the plunger, wherein the base further defines a slot configured to receive the plunger and the cradle such that placement of the plunger in the slot resists movement of the cradle.

Any of the foregoing embodiments may further include a support rail coupled to the base between the first side and the second side, wherein the plunger and the cradle are configured to be coupled to the slot on both sides of the support rail.

Any of the foregoing embodiments may further include at least one support arm coupled to the cradle and pivotably coupled to a pivot point on the base, such that the cradle is configured to move between the first position and the second position by pivoting the at least one support arm about the pivot point on the base.

In any of the foregoing embodiments, the at least one support arm includes two support arms each coupled to the pivot point on the base via a pin.

In any of the foregoing embodiments, the at least one support arm is pivotably coupled to the cradle to facilitate alignment of the cradle relative to the base in both of the first position and the second position.

Any of the foregoing embodiments may further include a locking mechanism configured to lock the cradle in at least one of the first position or the second position.

Any of the foregoing embodiments may further include a roller coupled to the base and configured to facilitate movement of the ULD across the cargo bay.

Also disclosed is a system for repositioning rails in a cargo bay of an aircraft. The system includes a base configured to be coupled to a structure in the cargo bay and having a first side and a second side. The system further includes a roller coupled to the base and configured to facilitate movement of a unit load device (ULD) across the cargo bay. The system further includes a cradle for receiving a rail for restricting movement of the ULD in at least one direction, the cradle configured to position the rail between a first position and a second position in which the rail is closer to the second side of the base than when the rail is in the second position.

Any of the foregoing embodiments may further include a plunger configured to be received by the base to resist movement of the plunger, wherein the base further defines a slot configured to receive the plunger and the cradle such that placement of the plunger in the slot resists movement of the cradle.

Any of the foregoing embodiments may further include a support rail coupled to the base between the first side and the second side, wherein the plunger and the cradle are configured to be coupled to the slot on both sides of the support rail.

Any of the foregoing embodiments may further include at least one support arm coupled to the cradle and pivotably coupled to a pivot point on the base, such that the cradle is configured to move between the first position and the second position by pivoting the at least one support arm about the pivot point on the base.

In any of the foregoing embodiments, the at least one support arm includes two support arms each coupled to the pivot point on the base via a pin.

In any of the foregoing embodiments, the at least one support arm is pivotably coupled to the cradle to facilitate alignment of the cradle relative to the base in both of the first position and the second position.

Also disclosed is a system for repositioning rails in a cargo bay of an aircraft. The system includes a base configured to be coupled to a structure in the cargo bay and having a first side and a second side. The system further includes a cradle for receiving a rail for restricting movement of a unit load device (ULD) in at least one direction, the cradle having a first wing extending away from the base and a second wing extending away from the base and located closer to the second side of the base than the first wing, and the cradle being configured to move the rail between a first position and a second position in which the rail is closer to the second side of the base than when the rail is in the second position.

Any of the foregoing embodiments may further include a plunger configured to be received by the base to resist movement of the plunger, wherein the base further defines a slot configured to receive the plunger and the cradle such that placement of the plunger in the slot resists movement of the cradle.

Any of the foregoing embodiments may further include at least one support arm coupled to the cradle and pivotably coupled to a pivot point on the base, such that the cradle is configured to move between the first position and the second position by pivoting the at least one support arm about the pivot point on the base.

In any of the foregoing embodiments, the at least one support arm is pivotably coupled to the cradle to facilitate alignment of the cradle relative to the base in both of the first position and the second position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3A illustrates a system for adjusting a location of a rail in the aircraft cargo deck of FIG. 2, in accordance with various embodiments;

FIG. 3B illustrates the system of FIG. 3A in a reconfigured position, in accordance with various embodiments;

FIG. 4A illustrates a system for adjusting a location of a rail for use in an aircraft cargo deck, in accordance with various embodiments; and FIG. 4B illustrates the system of FIG. 4A in a reconfigured position, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
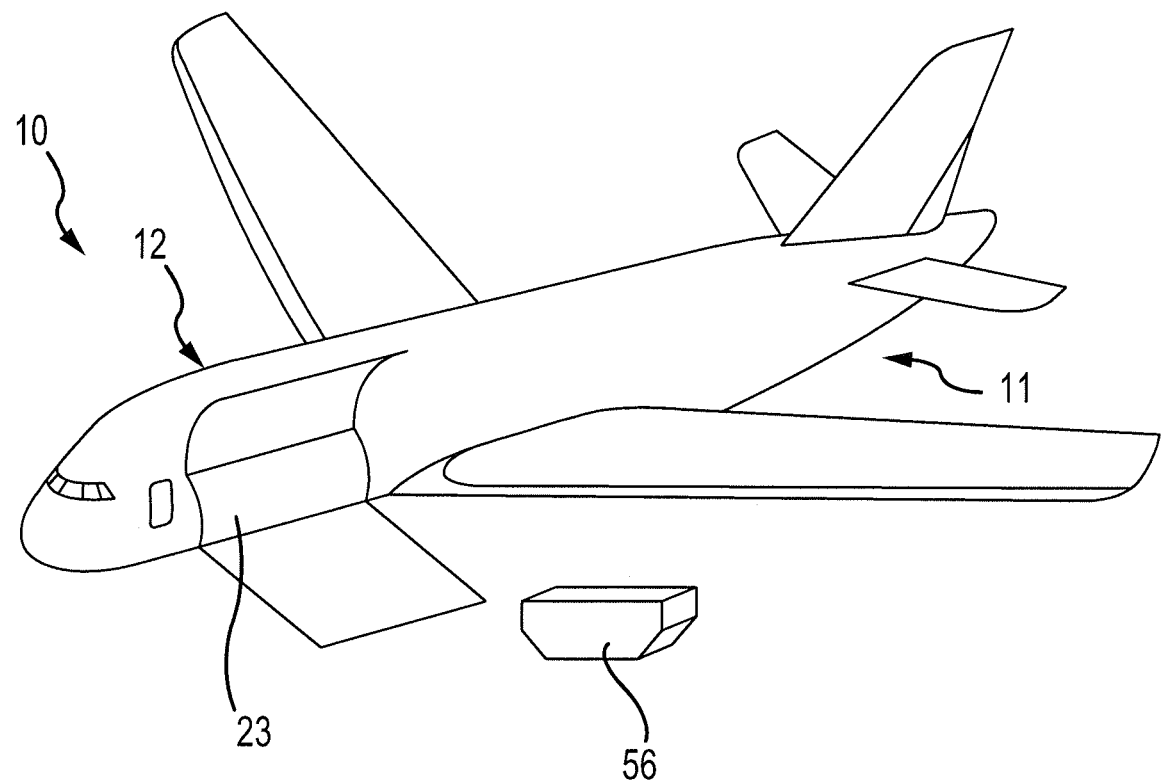
FIG. 1 illustrates an underside of an aircraft, in accordance with various embodiments.
Figure 2:
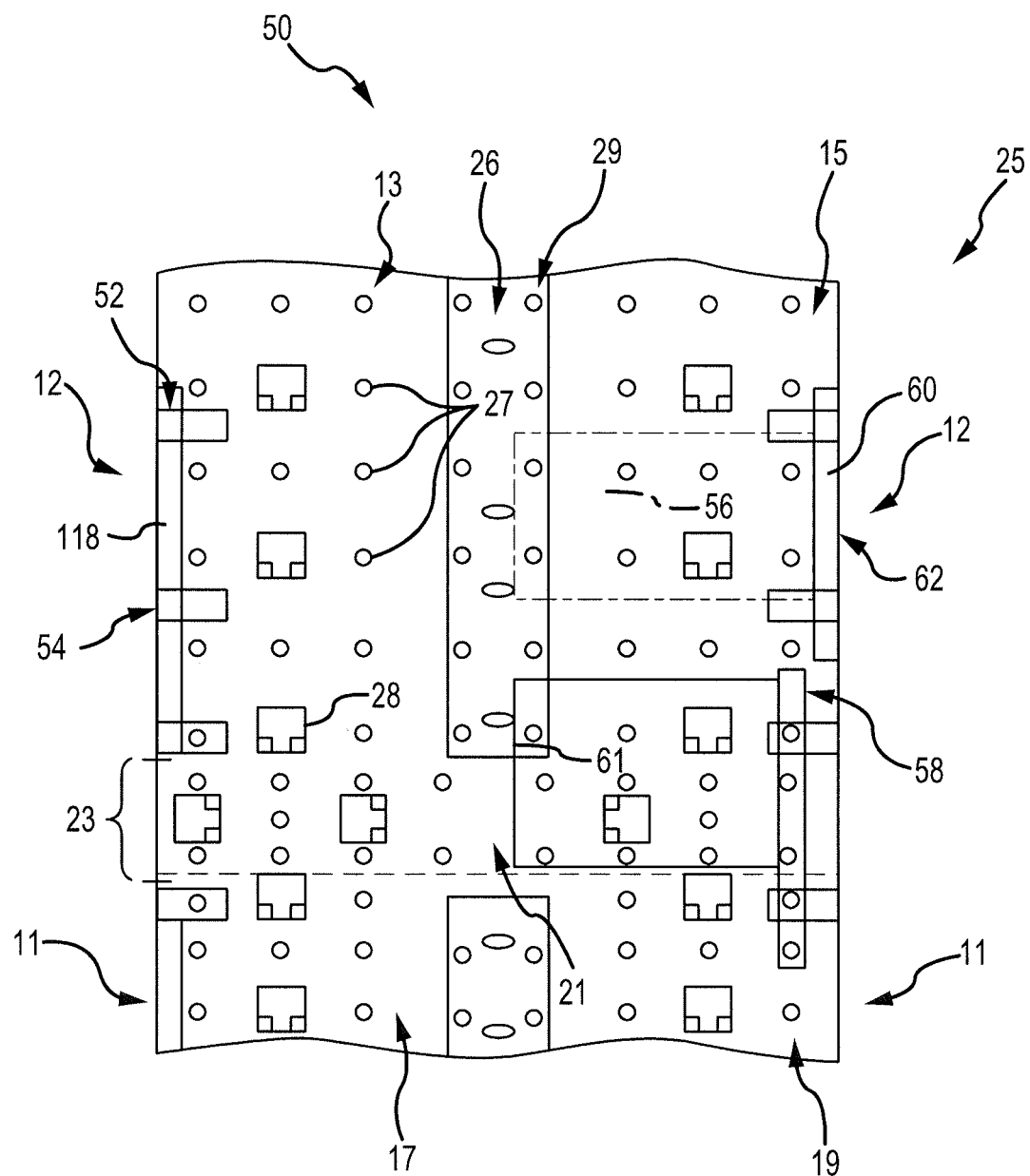
FIG. 2 illustrates an aircraft cargo deck of the aircraft of FIG. 1, in accordance with various embodiments.

Referring to FIGS. 1 and 2, an aircraft cargo deck 29 may be used to implement various embodiments of the present disclosure. A conveyance surface 26 forms a deck of an aircraft, adjacent to a cargo deck loading door 23. However, there are many other aircraft cargo deck configurations to which the embodiments of the disclosure can be implemented. For example, various aircraft, particularly those configured primarily for the transportation of cargo without passengers, may lack an upper passenger deck and may utilize an additional cargo deck installed in place of the upper passenger deck. The present disclosure allows for reconfiguration of the cargo deck 29 via the use of systems 52, including a system 54, that provides for repositioning of rails 58 (including a rail 118) in the cargo deck 29.

The cargo compartment includes a system 50 having a plurality of freely rotating conveyance rollers 27 mounted in the cargo deck 29 to define the conveyance plane. Cargo loaded onto the aircraft cargo deck 29 may be moved manually throughout the cargo deck 29 upon the freely rotating conveyance rollers 27. However, it may be desirable to electro-mechanically propel the cargo with minimal or no manual assistance, as some cargo may be relatively heavy and difficult to manipulate. In that regard, the H-shaped cargo surface may include a number of power drive units (PDUs) 28 that provide a mechanism upon which cargo is propelled over the conveyance rollers 27. Each PDU 28 may include one or more actuator that may move cargo relative to the cargo deck 29.

In the longitudinal direction, the conveyance surface 26 may include a left track and a right track along which cargo is to be stowed in parallel columns during flight. In the transverse direction, the cargo deck 29 may also be separated into a tail (or "aft") section 11 and a forward section 12. Thus, the left and right tracks may be divided into four sections, including two forward sections 13, 15 and two aft sections 17, 19. In addition to the four sections, there may be an additional path 21 between both tracks at the cargo deck loading door 23. This additional path 21 may divide the cargo deck 29 between the forward section 12 and aft section 11. This path is used to move cargo into and out the aircraft, and also to transfer cargo between the left and right storage tracks. In various embodiments, the cargo deck 29 may be divided into any quantity of sections, from a single section to any quantity that is physically possible. For example, the systems disclosed herein may operate in a cargo handling system having a single longitudinal lane.

In various embodiments, a piece of cargo (referred to as a "unit load device" (ULD) 56)) may be moved relative to the cargo deck 29. Various ULDs may have differing dimensions such as ULD 56 and 61. In that regard, the systems 52 may be used to adjust the rails 58 and 62 within the cargo deck 29 to facilitate movement and storage of ULDs of various sizes. For example, a rail 62 may resist movement of the ULD 56 in at least one direction and a rail 58 may resist movement of the ULD 61 in at least one direction. As mentioned above, the ULD 56 and the ULD 61 may have different dimensions. The systems 52 may adjust the positioning of the rails 58 and 60 to facilitate storage of ULDs of various sizes on the cargo deck 29.

Referring now to FIGS. 3A and 3B, additional details of the system 54 are shown. In particular, the system 54 may include a base 100. The base 100 may be coupled to a floorboard or other structure in a cargo bay. The base 100 may include a first side 102 and a second side 104. The second side 104 may be located closer to a wall of the cargo bay than the first side 102.

The system 54 may further include a cradle 106. The cradle 106 may be designed to receive a rail (e.g., the rail 118 of FIG. 3C). The cradle 106 may include a first wing 108 extending outward from the base 100, a second wing 110 likewise extending outward from the base 100, and a rail support 109 extending from the first wing 108 to the second wing 110. The first wing 108 may define a first fastener aperture 112 and the second wing 110 may define a second fastener aperture 114.

Figure 3C:
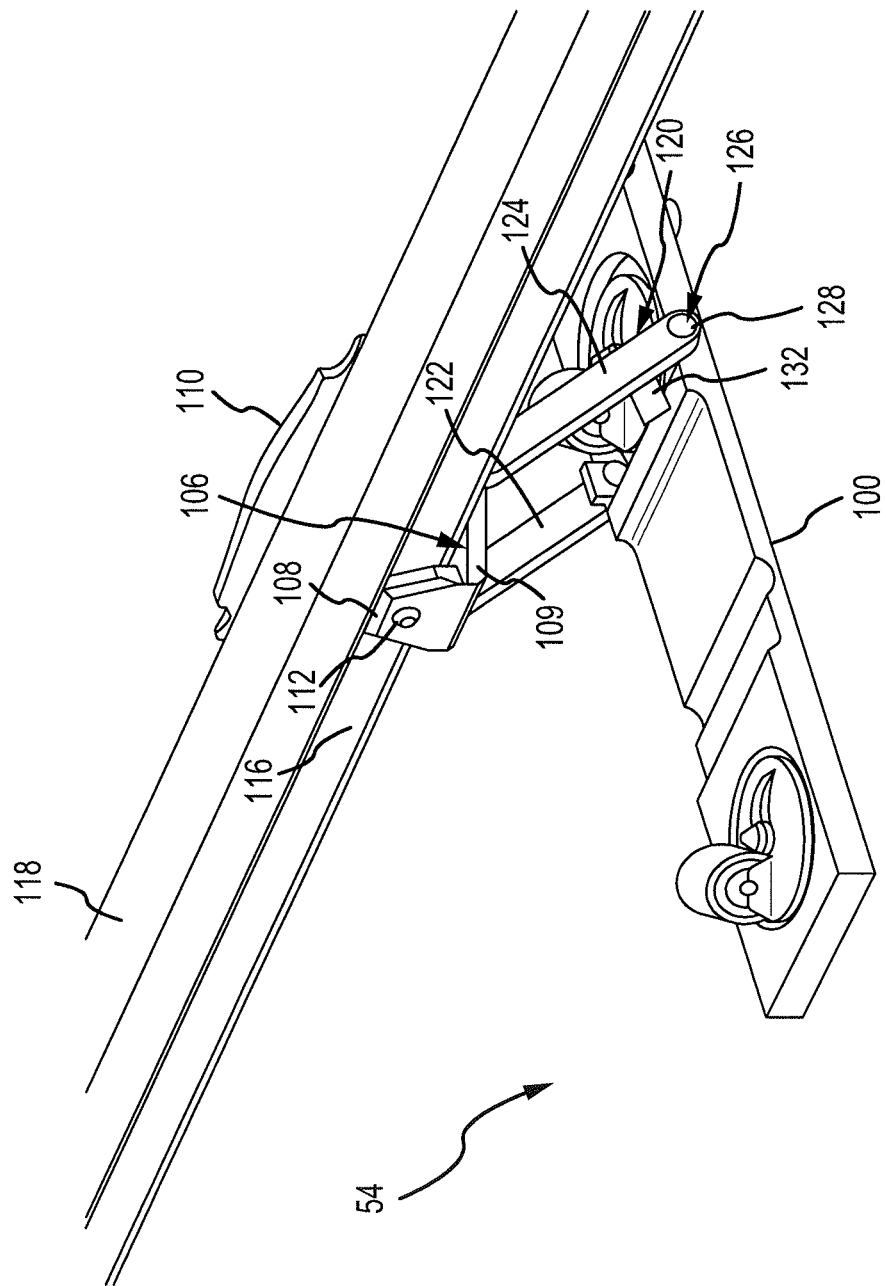
FIG. 3C illustrates the system of FIG. 3A with a rail attached to a cradle of the system, in accordance with various embodiments.

For example and referring to FIGS. 3A, 3B, and 3C, a fastener 116 may extend through the first fastener aperture 112, the second fastener aperture 114, and the rail 118 in order to couple the rail 118 to the cradle 106.

The system 54 may further include support arms 120 which may include a first support arm 122 and a second support arm 124. The support arms 120 may be pivotably coupled to the base 100 at a pivot point 126 (e.g., via a pivot mechanism). For example, a pin 128 may extend through the support arms 120 and the base 100 in order to pivotably couple the support arms 120 to the base 100. The support arms 120 may likewise be pivotally coupled to the cradle 106 (e.g., via a pivot mechanism, for example, via pins 130).

In order to adjust the position of the rail 118 relative to the base 100 (and, thus, the cargo bay), the support arms 120 may pivot about the pivot point 126, thus moving the cradle 106 (and the rail 118) between a first position (shown in FIG. 3B) and a second position in which the cradle 106 is closer to the second side 104 than in the first position (as shown in FIG. 3A). Due to the pivotable coupling of the support arms 120 to the cradle 106 (i.e., via the pivot mechanism), the cradle 106 (and thus the rail 118) may remain in an upright (or any configured) position during the transition between the first position and the second position (as shown in FIG. 3C), and in response to the cradle 106 being in the first position and the second position.

The system 54 may further include a lock, or locking mechanism, 132. The lock 132 may include any locking mechanism such as a pin and socket, a movable lever (as shown), or the like. As shown, the lock 132 includes a movable lever coupled to at least one of the support arms 120. The movable lever may slide underneath the base 100 in response to the system 54 being in the desired position (e.g., first position or second position) in order to resist movement of the cradle 106 relative to the base 100.

In various embodiments, the system 54 may further include rollers 134 (e.g., conveyance rollers) coupled to the base. In particular, the system 54 includes a first roller 136 and a second roller 138. In various embodiments, the cradle 106 may be positioned on one side (e.g., towards the first side 102) of the second roller 138 in response to the system 54 being in the second position, and on the other side (e.g., towards the second side 104) of the second roller 138 in response to the system 54 being in the first position.

Turning to FIGS. 4A and 4B, another system 254 may function in a similar manner as the system 54 of FIGS. 3A, 3B, and 3C. In particular, the system 254 may include a base 200 that has a first side 202 and a second side 204. The base 200 may be designed to be coupled to a floor panel or other structure in a cargo bay.

The system 254 may further include a cradle 206 having similar features as the cradle 106 of FIGS. 3A, 3B, and 3C. In particular, the cradle 206 includes a first wing 208, a second wing 210, and the rail support 209 connecting the first wing 208 to the second wing 210. A rail may be designed to be coupled to the cradle 206.

The base 200 may include a first support rail 221 located at or near the second side 204 along with a second support rail 222 located between the first side 202 and the first support rail 221.

The system 254 may further include a plunger 212 and a plunger stop 214. The plunger 212 and the plunger stop 214 are designed to be received by a slot 216 defined by the base. The base 200 may further define first plunger apertures 218 and second plunger apertures 220 located closer to the second side 204 than the first plunger apertures 218. The plunger 212 and the plunger stop 214 are designed to be received by at least one of the slot 216, the first plunger apertures 218, or the second plunger apertures 220. For example, the plunger 212 and the plunger stop 214 may each be designed to be received by one of the first plunger apertures 218 or by one of the second plunger apertures 220. For example, a nut may be applied to a portion of the plunger 212 after the plunger 212 is inserted into one of the plunger apertures 218, 220. As another example, the plunger 212 may press-fit into one or both of the plunger apertures 218, 220.

The cradle 206 is designed to be located in a first position (as shown in FIG. 4B) and a second position (as shown in FIG. 4A). The cradle 206 is designed to be closer to the second side 204 in response to the cradle 206 being in the second position.

In order to couple the cradle 206 in the first position, the cradle 206 may be positioned adjacent to the second support rail 222. The plunger 212 and the plunger stop 214 may be received by the first plunger apertures 218. In that regard, the cradle 206 (and thus any rail) may be restricted from movement along the base 200 by being sandwiched between the plunger 212 and the second support rail 222.

In order to couple the cradle 206 in the second position, the cradle 206 may be positioned adjacent to the first support rail 221. The plunger 212 and the plunger stop 214 may be received by the second plunger apertures 220. In that regard, the cradle 206 may be restricted from movement along the base 200 by being sandwiched between the plunger 212 and the first support rail 221.

The system 254 may further include a first roller 224 and a second roller 226. In various embodiments, the cradle 206 may be located on a first side (e.g., closer to the first side 202) of the second support rail 222 and the second roller 226 in response to the cradle 206 being in the first position. In various embodiments, the cradle may be located on a second side (e.g., closer to the second side 204) of the second support rail 222 and the second roller 226 in response to the cradle 206 being in the second position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for repositioning rails in a cargo bay of an aircraft, the system comprising:
    a rail configured to restrict movement of a unit load device (ULD) in at least one direction;
    a base configured to be coupled to a structure in the cargo bay and having a first side and a second side; and
    a cradle configured to move the rail between a first position and a second position in which the rail is closer to the second side of the base than when the rail is in the first position, the cradle configured to remain in an upright position during a transition between the first position and the second position; and
    at least one support arm coupled to the cradle and pivotably coupled to a pivot point on the base, wherein the cradle is configured to move the rail between the first position and the second position by pivoting the at least one support arm about the pivot point on the base.

2. The system of claim 1, wherein the cradle includes a first wing extending away from the base and a second wing extending away from the base and located closer to the second side of the base than the first wing.

3. The system of claim 2, wherein:
    the first wing and the second wing each define a fastener aperture, and
    the rail is configured to be retained in place relative to the cradle by extending a fastener through the fastener aperture of the first wing and the second wing and through the rail.

4. The system of claim 1, wherein the at least one support arm includes two support arms each coupled to the pivot point on the base via a pin.

5. The system of claim 1, wherein the at least one support arm is pivotably coupled to the cradle to facilitate alignment of the cradle relative to the base in both of the first position and the second position.

6. The system of claim 1, further comprising a locking mechanism configured to lock the cradle the first position and the second position.

7. The system of claim 1, further comprising a roller coupled to the base and configured to facilitate movement of the ULD across the cargo bay.

8. The system of claim 1, wherein the cradle comprises a rail support, a first wing, and a second wing, the first wing extending outward from the rail support, the second wing extending outward from the rail support on an opposite side of the rail support from the first wing.

9. A system for repositioning rails in a cargo bay of an aircraft, the system comprising:
    a rail configured to restrict movement of a unit load device (ULD) in at least one direction;
    a base configured to be coupled to a structure in the cargo bay and having a first side and a second side;
    a roller coupled to the base and configured to facilitate movement of the ULD across the cargo bay;
    a cradle configured to move the rail between a first position and a second position in which the rail is closer to the second side of the base than when the rail is in the first position, the cradle configured to remain in an upright position during a transition between the first position and the second position; and
    at least one support arm coupled to the cradle and pivotably coupled to a pivot point on the base, wherein the cradle is configured to move the rail between the first position and the second position by pivoting the at least one support arm about the pivot point on the base.

10. The system of claim 9, wherein the at least one support arm includes two support arms each coupled to the pivot point on the base via a pin.

11. The system of claim 9, wherein the at least one support arm is pivotably coupled to the cradle to facilitate alignment of the cradle relative to the base in both of the first position and the second position.

12. The system of claim 9, wherein the cradle comprises a rail support, a first wing, and a second wing, the first wing extending outward from the rail support, the second wing extending outward from the rail support on an opposite side of the rail support from the first wing.

13. A system for repositioning rails in a cargo bay of an aircraft, the system comprising:
    a rail configured to restrict movement of a unit load device (ULD) in at least one direction;
    a base configured to be coupled to a structure in the cargo bay and having a first side and a second side;
    a cradle having a first wing extending away from the base and a second wing extending away from the base and located closer to the second side of the base than the first wing, and the cradle being configured to move the rail between a first position and a second position in which the rail is closer to the second side of the base than when the rail is in the first position, the cradle configured to remain in an upright position during a transition between the first position and the second position; and
    at least one support arm coupled to the cradle and pivotably coupled to a pivot point on the base, wherein the cradle is configured to move the rail between the first position and the second position by pivoting the at least one support arm about the pivot point on the base.

14. The system of claim 13, wherein the at least one support arm is pivotably coupled to the cradle to facilitate alignment of the cradle relative to the base in both of the first position and the second position.

* * * * *